United States Patent
Lin et al.

(10) Patent No.: US 12,182,701 B2
(45) Date of Patent: Dec. 31, 2024

(54) MEMORY AND TRAINING METHOD FOR NEURAL NETWORK BASED ON MEMORY

(71) Applicant: MACRONIX INTERNATIONAL CO., LTD., Hsinchu (TW)

(72) Inventors: Yu-Hsuan Lin, Taichung (TW); Po-Kai Hsu, Tainan (TW); Ming-Liang Wei, Kaohsiung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 770 days.

(21) Appl. No.: 17/388,053

(22) Filed: Jul. 29, 2021

(65) Prior Publication Data

US 2023/0034366 A1   Feb. 2, 2023

(51) Int. Cl.
*G06N 3/08* (2023.01)

(52) U.S. Cl.
CPC ....................................... *G06N 3/08* (2013.01)

(58) Field of Classification Search
CPC .. G06N 3/08; G06N 3/04; G06N 3/06; G06N 3/063
See application file for complete search history.

(56) References Cited

U.S. PATENT DOCUMENTS

| 2014/0226388 | A1* | 8/2014 | Khoueir | G11C 13/0004 365/163 |
|---|---|---|---|---|
| 2020/0034686 | A1 | 1/2020 | Chiu et al. | |
| 2020/0372331 | A1 | 11/2020 | Chang et al. | |
| 2021/0103806 | A1 | 4/2021 | Blaichman et al. | |
| 2022/0374688 | A1* | 11/2022 | Wu | G06N 3/08 |
| 2022/0391681 | A1* | 12/2022 | Gokmen | G06N 3/08 |

FOREIGN PATENT DOCUMENTS

| CN | 109901784 A | 6/2019 |
|---|---|---|
| TW | 202044126 A | 12/2020 |
| WO | 2020/125839 A1 | 6/2020 |

* cited by examiner

*Primary Examiner* — Kamran Afshar
*Assistant Examiner* — Brian J Hales
(74) *Attorney, Agent, or Firm* — McClure, Qualey & Rodack, LLP

(57) ABSTRACT

The present invention discloses a memory and a training method for neural network based on memory. The training method includes: obtaining one or more transfer functions of a memory corresponding to one or more influence factors; determining a training plan according to an ideal case and the one or more influence factors; training the neural network according to the training plan and the one or more transfer functions to obtain a plurality of weights of the trained neural network; and programming the memory according to the weights.

8 Claims, 3 Drawing Sheets

MEMORY AND TRAINING METHOD FOR NEURAL NETWORK BASED ON MEMORY

BACKGROUND OF THE INVENTION

Field of the Invention

The invention relates to a memory and a training method for neural based on memory.

Description of the Related Art

Neural network (NN) is a mathematical model which could be applied to machine learning. In the past, neural networks might be built with mathematical models by software on computer devices, and operated by processors based on the mathematical models. As the requirements for computing speed increase, the use of memory with high-speed computing capabilities to implement neural networks has also become the focus of research. This technique is called computing in memory (CIM). Although CIM has many advantages, due to the characteristics of memory, such as temperature, the number of reads and writes, the relationship between the input and output of the memory cells is usually not ideally linear. How to reduce the adverse effects of non-ideal memory on the accuracy of decisions made based on the results calculated in memory is an important issue.

SUMMARY OF THE INVENTION

An embodiment of the present invention discloses a training method for neural network based on memory. The training method includes: obtaining one or more transfer functions of a memory corresponding to one or more influence factors; determining a training plan according to an ideal case and the one or more influence factors; training the neural network according to the training plan and the one or more transfer functions to obtain a plurality of weights of the trained neural network; and programming the memory according to the weights.

Another embodiment of the present invention discloses a memory. The memory includes a number of memory cells, configured to represent a number of synapses of a neural network. Each of the memory cells includes a resistor. The resistances of the resistors are determined by the following: obtaining one or more transfer functions of the memory cells corresponding to one or more influence factors; determining a training plan according to an ideal case and the one or more influence factors; training the neural network according to the training plan and the one or more transfer functions to obtain a plurality of weights of the trained neural network; and programming the memory according to Referring to FIG. 1, FIG. 1 shows a schematic diagram of an operation memory. The operation memory 10 includes a number of word lines WL1~WL3, a number of bit lines BL1~BL3 and a number of memory cells C11~C33. Each of the memory cells C11~C33 is coupled to a corresponding word line and a corresponding bit line. The memory cells C11~C33 may respectively include a variable resistor, the resistance are respectively R11~R33. In an embodiment, the variable resistor could be implemented by a transistor. The operation memory 10 could implement sum-of-product operation of a neural network by computing in memory. The operation principle of the operation memory 10 would be described below.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
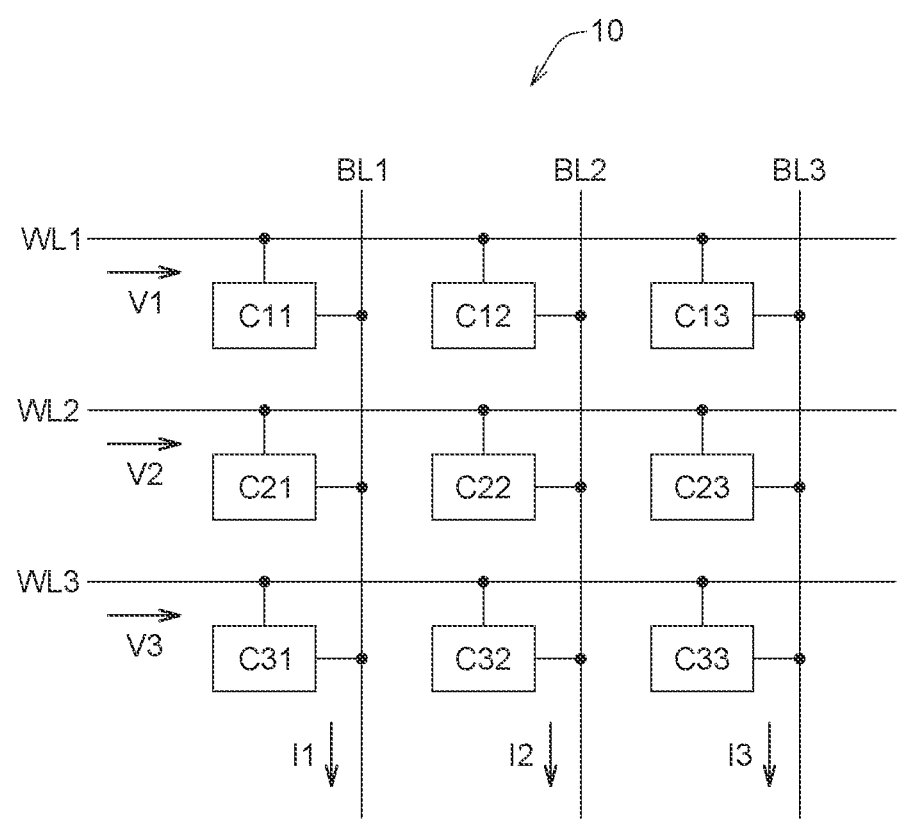
FIG. 1 shows a schematic diagram of an operation memory.

Referring to FIG. 1, FIG. 1 shows a schematic diagram of an operation memory. operation memory 10 includes a number of word lines WL1~WL3, a number of bit lines BL1~BL3 and a number of memory cells C11~C33. Each of the memory cells C11~C33 is coupled to a corresponding word line and a corresponding bit line. The memory cells C11~C33 may respectively include a variable resistor, the resistance are respectively R11~R33. In an embodiment, the variable resistor could be implemented by a transistor. The operation memory 10 could implement sum-of-product operation of a neutral network by computing in memory. The operation principle of the operation memory 10 would be described below.

The memory cells C11~C33 could represent a number of synapses of the neural network. The resistance R11~R33 (or conductance, i.e., reciprocal of the resistance) of the variable resistor of the memory cells C11~C33 could represent a number of weight of the synapses. The input voltage V1~V3 of the word lines WL1~WL3 could represent the input data. The output currents I1~I3 sensed on the bit lines BL1~BL3 would be: $I1=V1*1/R11+V2*1/R21+V3*1/R31$, $I2=V1*1/R12+V2*1/R22+V3*1/R32$, $I3=V1*1/R13+V2*1/R23+V3*1/R33$. The currents I1~I3 represent the results obtained by the operation of the neural network with the input data. The currents I1~I3 could be sent to a decision circuit (not shown) for a subsequent operation to generate a decision.

Noted that the example in FIG. 1 has been simplified for the purpose of illustration. In practice, the amount of the memory cells of the operation memory is huge, and the architecture of the operation memory would vary with the neural network to be implemented.

In order to improve the accuracy of decision-making, the neural network usually would be trained. For example, training data would be input to the neural network for operation. Decisions would be generated according to the results calculated by the neural network. The decisions would be compared with the ground truth corresponding to the training data. The weights of the neural network would be modified according to the comparison results. Currently, there are two approaches for training the neural network based on memory: (1) training by a computer device with software according to the ideal mathematical model of the neural network, and (2) training on the memory. However, the approach (1) does not consider the non-ideal characteristics of the memory, and the approach (2) does not consider the ideal mathematical model. When performing the in-memory calculations of the neural network trained by the above two approaches, the accuracy of the decisions made based on the results of the in-memory calculations is insufficient. In order to solve the above problem, the present invention provides a training method for neural network based on memory.

Figure 2:
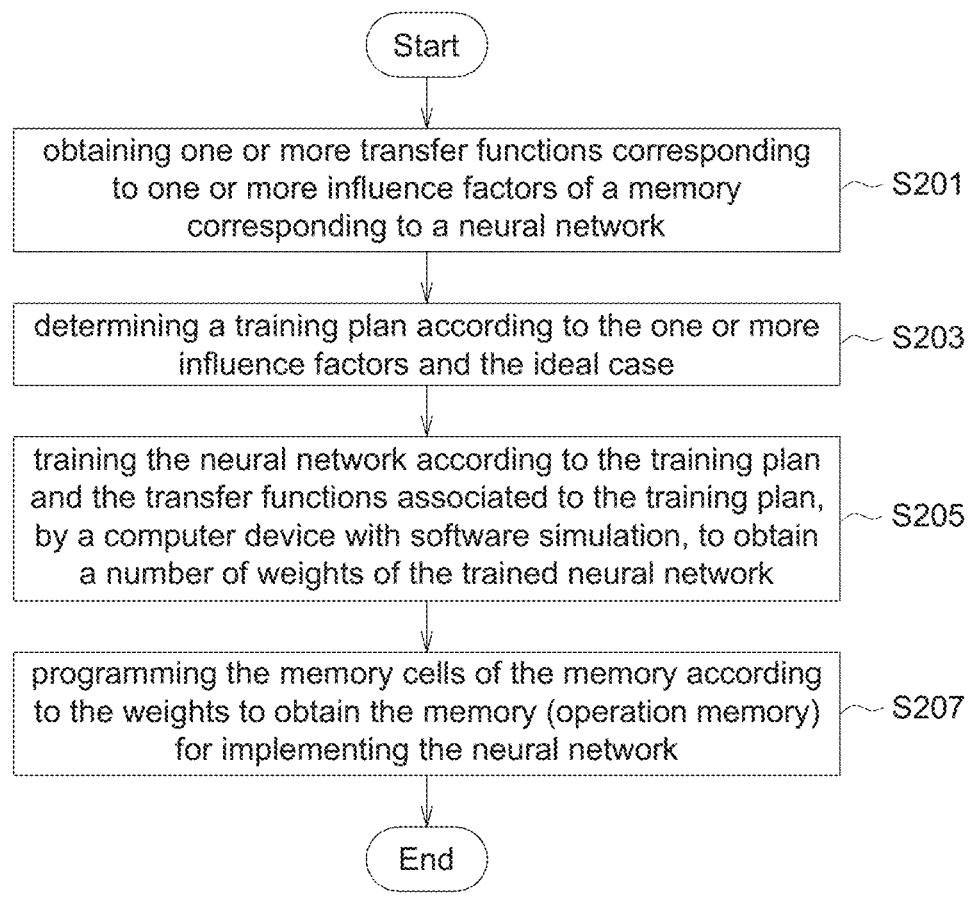
FIG. 2 shows a flowchart of a training method according to an embodiment of the present invention.

Referring to FIG. 2, FIG. 2 shows a flowchart of a training method according to an embodiment of the present invention. The training method could be applied to a neural network based on memory.

At step S201, one or more transfer functions corresponding to one or more influence factors of a memory corresponding to a neural network are obtained. The memory corresponding to the neural network refers to the memory is used as a hardware for implementing the neural network. The transfer function refers to a relationship between the input and the output of the memory cells of the memory corresponding to the influence factor. The influence factors may include different temperatures, different number of reads and writes, different input voltages, change at each read operation, memory retention, programming error and so on. The memory retention refers to the time that data stored in the memory cell. The programming error refers to the difference between the real value and the ideal value to be written while programming. For example, the influence factors may include a temperature of 40 degree Celsius, a temperature of 50 degree Celsius, 5000 reads and writes, 10000 reads and writes and so on. In actual memory, the components such as the transistors and the variable resistors of the memory cells are usually non-ideal. Such non-ideal characteristics would lead to a ratio of the input voltage to the output current of the memory cells to be not a fixed value due to the influence of the influence factors. the weights.

Figure 3:
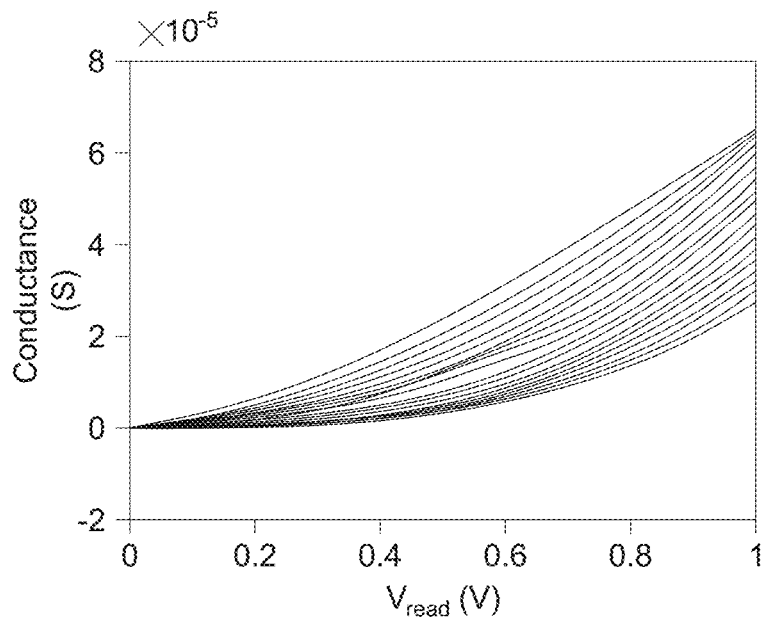
FIG. 3 shows a schematic diagram of transfer functions.

Referring to FIG. 3, FIG. 3 shows the relationships between the input voltage and the output current of the memory cell corresponding to a specific temperature. In FIG. 3, the horizontal axis represents the input voltage of the memory cell, the vertical axis represents the output current of the memory cell, the curves represent different transfer functions which correspond to different resistances to be programmed for the memory cell. In the ideal case, a specific weight corresponds to a specific resistance. If the weight is constant, the resistance would not change. That is, in the ideal case, the ratio of the input voltage to the output current is constant. The transfer functions should be straight lines. However, in a real case (non-ideal case). The ratio of the input voltage to the output current would change with the input voltage. As shown in FIG. 3, the transfer functions are not straight lines in real case.

Noted that the transfer functions could be obtained through actual testing, historical records and any other means. The present invention is not limited.

Figure 4:
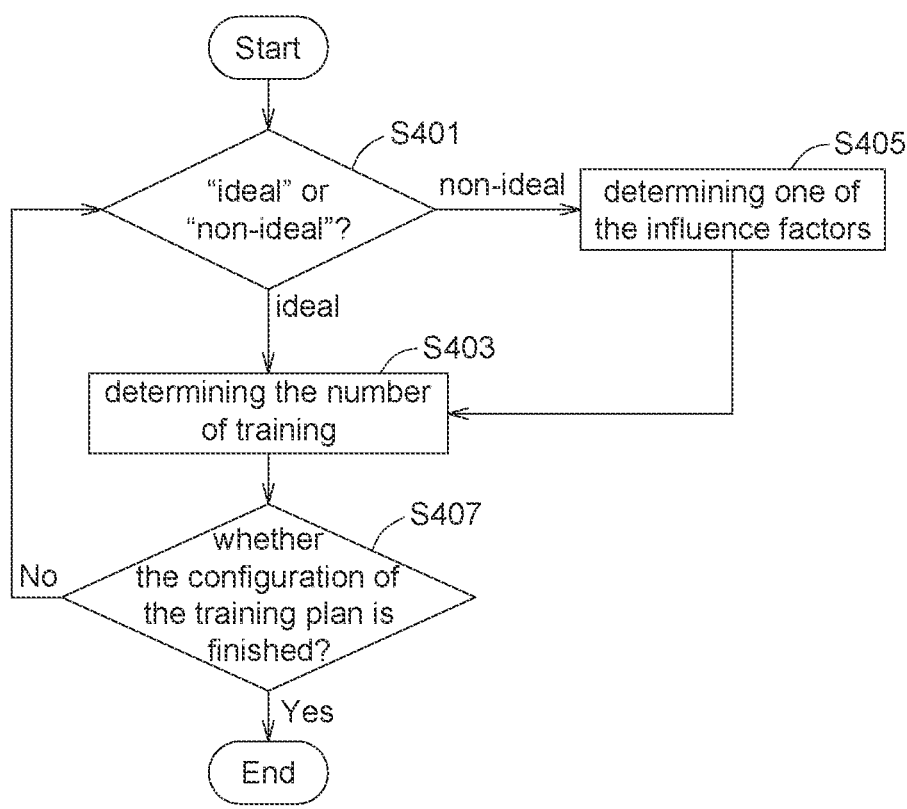
FIG. 4 shows a flowchart for determining a training plan according to an embodiment of the present invention.

At step S203, a training plan is determined according to the one or more influence factors and the ideal case. The ideal case represents the memory would not be affected by any influence factor so that the ideal mathematical model of the neural network is met. In other words, in ideal case, for each of the memory cells, the ratio of the input voltage to the output current corresponding to a specific resistance is constant. In an embodiment, determining the training plan may include steps S401~S407, as shown in FIG. 4. At step S401, "ideal" or "non-ideal" is determined. While "ideal" is determined, perform step S403, and while "non-ideal" is determine, perform step S405. At step S403, the number of training for the determined case is determined, and the training plan is updated. At step S405, one of the influence factors is determined. That is, one of the influence factors would be selected and then step S403 would be performed to determine the number of training for the selected influence factor. At step S407, whether the configuration of the training plan is finished is determined. If the determination is false, go back to step S401, and if the determination is true, end the process. For understanding, an example would be described below. Firstly, steps S401 and S403 are performed so that "ideal" for 5 times is added to the training plan. Then, back to step S401 to select "non-ideal," and steps S405 and S403 are performed so that the influence factor "40 degrees Celsius" for 10 times is added to the training plan. Go back to step S401 again to select "non-ideal," and steps S405 and S403 are performed so that the influence factor "10000 reads and writes" for 7 times is added to the training plan. Then, end the process. The training plan would be obtained as follow: [(ideal, 5 times); (40 degrees Celsius, 10 times); (10000 reads and writes, 7 times)]. In an embodiment, the content of the training plan could be scheduled. For example, the scheduled training plan in the previous example could be: [(ideal, 2 times); (40 degrees Celsius, 5 times); (ideal, 1 time); (10000 reads and writes, 3 times); (ideal, 1 time); (10000 reads and writes, 4 times); (ideal, 1 time); (40 degrees Celsius, 5 times)]. That is, the training for the ideal case and different influence factors could be staggered. And, the training for the same influence factor does not have to be arranged together. Interspersed training for different influence factors could prevent the neural network from being too affected by specific influence factor, so that multiple influence factors have an even contribution to the neural network. In practice, the frequency and the number of training times of each influence factor in the training plan could be adaptively arranged according to the actual characteristics of the memory. For example, while the memory is sensitive to temperature, by increasing the frequency and the number of training times of the influencing factor "temperature" in the training plan, the trained neural network could be better at dealing with the effects of temperature changes.

At step S205, the neural network is trained according to the training plan and the transfer functions associated to the training plan, by a computer device with software simulation, to obtain a number of weights of the trained neural network. "Simulation" refers to perform the operation of the mathematical model of the neural network by a processor of the computer device, and simulate the non-ideal cases with software. "Simulate the non-ideal cases with software" refers to, while performing the training for one of the influence factors, for each of the synapses of the neural network, adjust the output value of the synapse according to the transfer function according to the influence factor, the weight corresponding to the synapse and the input value of the synapse. In an embodiment, the training of the neural network could be performed sequentially according to the training plan. In another embodiment, the training of the neural network could be performed in any order according to the training plan. In general, a process of a single training may include: inputting training data to the neural network; calculating by the neural network according to the training data to obtain one or more decision parameters; generating a decision according to the decision parameters; calculating a score according to the decision and the ground truth corresponding to the training data; and modifying one or more weight of the neural network. Since the details of the training process have many existing techniques, it would not be described herein.

At step S207, the memory cells of the memory are programmed according to the weights to obtain the memory (operation memory) for implementing the neural network.

Noted that the training method of the present invention could be applied to any suitable memory type. For example, phase-change memory (PCM), Ferroelectronic RAM (Fe-RAM) could apply the training method of the present invention.

In addition, according to the above training method, the present invention further provides a memory. The memory includes a number of memory cells. Each of the memory cells includes a resistor. The memory cells represent a number of synapses of a neural network. The resistances of the resistors of the memory cells are determined according to a number of weights obtained through the above training method.

Refer to Table 1. In Table 1, ACCi is the accuracy of the decision obtained by calculation based on the computer device simulating the trained neural network in ideal case, and ACCn is the accuracy of the decision obtained by performing calculations based on the memory used to implement the trained neural network. From Table 1, in the five tests, the difference between the accuracy based on the ideal case and the accuracy based on the computing in memory is within 2%. This means that the training method proposed by the present invention could effectively improve the problem of reduced accuracy of subsequent decisions caused by the characteristics of the memory itself when the memory is used to implement a neural network.

TABLE 1

|        | ACCi   | ACCn   | \|ACCi-ACCn\|/ACCi |
|--------|--------|--------|---------------------|
| Test 1 | 0.8756 | 0.8818 | 0.71%               |
| Test 2 | 0.8668 | 0.8735 | 0.77%               |
| Test 3 | 0.8683 | 0.8745 | 1.55%               |
| Test 4 | 0.8731 | 0.8651 | 0.78%               |
| Test 5 | 0.8585 | 0.8529 | 0.65%               |

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A training method for a neural network based on a memory, comprising:
    obtaining one or more transfer functions of a memory corresponding to one or more influence factors;
    determining a training plan according to an ideal case and the one or more influence factors;
    training the neural network according to the training plan and the one or more transfer functions to obtain a plurality of weights of the trained neural network, wherein while performing training for a determined influence factor of the one or more influence factors, a plurality of outputs of a plurality of synapses of the neural network are adjusted according to the one or more transfer functions corresponding to the determined influence factor, a plurality of inputs of the plurality of synapses and a plurality of untrained weights of the plurality of synapses; and
    programming the memory, by adjusting a plurality of resistors of a plurality of memory cells configured to represent the plurality of synapses of the neural network based on the memory according to the plurality of weights.

2. The training method according to claim 1, wherein the one or more influence factors comprises temperature, a number of reads and writes, input voltage, change at each read operation, memory retention and programming error.

3. The training method according to claim 1, wherein determining the training plan according to the ideal case and the one or more influence factors comprises: determining a first training time for the ideal case, and updating the training plan; and selecting at least one of the one or more influence factors, determining a second training time respectively for the selected at least one influence factor, and updating the training plan.

4. The training method according to claim 3, wherein in the training plan, trainings corresponding to the ideal case are interspersed between the trainings corresponding to the one or more influence factors.

5. A memory, comprising:
    a plurality of memory cells, configured to represent a plurality of synapses of a neural network, each of the plurality of memory cells comprising a resistor, wherein a plurality of resistance of the resistors are determined by the following:
        obtaining one or more transfer functions of the memory cells corresponding to one or more influence factors;
        determining a training plan according to an ideal case and the one or more influence factors;
        training the neural network according to the training plan and the one or more transfer functions to obtain a plurality of weights of the trained neural network, wherein while performing training for a determined influence factor of the one or more influence factors, a plurality of outputs of a plurality of synapses of the neural network are adjusted according to the one or more transfer functions corresponding to the determined influence factor, a plurality of inputs of the plurality of synapses and a plurality of untrained weights of the plurality of synapses; and
        programming the memory, by adjusting a plurality of resistors of the plurality of memory cells configured to represent the plurality of synapses of the neural network based on the memory according to the plurality of weights.

6. The memory according to claim 5, wherein the one or more influence factors comprises temperature, a number of reads and writes, input voltage, change at each read operation, memory retention and programming error.

7. The memory according to claim 5, wherein determining the training plan according to the ideal case and the one or more influence factors comprises: determining a first training time for the ideal case, and updating the training plan; and selecting at least one of the one or more influence factors, determining a second training time respectively for the selected at least one influence factor, and updating the training plan.

8. The memory according to claim 7, wherein in the training plan, trainings corresponding to the ideal case are interspersed between the trainings corresponding to the one or more influence factors.

* * * * *